United States Patent [19]

Kagiyama et al.

[11] Patent Number: 4,850,932
[45] Date of Patent: Jul. 25, 1989

[54] DEVICE FOR ABSORBING VARIATION IN TORQUE

[75] Inventors: Junji Kagiyama, Toyota; Kiyonori Kobayashi, Chiryu; Masakazu Kamiya, Toyoake, all of Japan

[73] Assignee: Aisin Seiki Kabushiki Kaisha, Kariya, Japan

[21] Appl. No.: 101,482

[22] Filed: Sep. 28, 1987

[30] Foreign Application Priority Data

Sep. 30, 1986 [JP] Japan ................. 61-231556

[51] Int. Cl.⁴ .................. F16D 3/14; F16F 15/12
[52] U.S. Cl. ................................. 464/68; 74/574; 192/106.2
[58] Field of Search .............. 74/574; 192/106.2; 464/64, 66, 68

[56] References Cited

U.S. PATENT DOCUMENTS

| | | | |
|---|---|---|---|
| 4,484,898 | 11/1984 | Kohno | 464/68 X |
| 4,662,239 | 5/1987 | Wörner et al. | 464/68 X |
| 4,663,983 | 5/1987 | Kobayashi et al. | 464/68 X |
| 4,681,199 | 7/1987 | Maucher et al. | 192/70.23 |
| 4,714,449 | 12/1987 | Woerner et al. | 464/68 |
| 4,724,719 | 2/1988 | Wërner et al. | 464/68 X |

FOREIGN PATENT DOCUMENTS 2153970  8/1985  United Kingdom ............ 192/106.2

*Primary Examiner*—Daniel P. Stodola
*Attorney, Agent, or Firm*—Burns, Doane, Swecker & Mathis

[57] ABSTRACT

A torque variation absorbing device for e.g. an automobile engine includes a hysteretic mechanism, a damper mechanism and a torque limiting mechanism which are disposed between two separate, concentric and rotatable inertial bodies. The damper mechanism comprises a plurality of elastic bodies disposed in series between the inertial bodies. A plurality of friction members and a plurality of floating disks are provided between the inertial bodies so that the floating disks may create a very small magnitude of hysteresis through the friction members and act upon at least one of the elastic bodies upon contraction of the latter to absorb any fine variation in torque.

4 Claims, 3 Drawing Sheets

DEVICE FOR ABSORBING VARIATION IN TORQUE

BACKGROUND OF THE INVENTION

1. Field of the Invention

This invention relates to a device for absorbing variation in a rotating force or torque to transmit it smoothly from a driving shaft, such as the output shaft of an automobile engine, to a driven shaft.

2. Description of the Prior Art

Devices of the type to which this invention pertains are disclosed in, for example, Japanese Laid-Open Patent Specification No. 57739/1980 and Japanese Patent Application No. 174452/1984. These devices are effective at a practical rotating speed of e.g. an engine if their own natural frequency is allowed to stay below the practical rotating speed (or idling speed) of the engine. This, however, requires the provision of play having a certain angle to obtain a wide angle of torsion.

The damper mechanism which any such known device includes can produce only a limited angle of torsion. It is, therefore, necessary to provide a first stage of play having a by far greater angle than is normally required.

If the play has a great angle, however, the ON-OFF operation of an accelerator at a torque of about 0 kgm results in a rattling differential or a sobbing vehicle. A large magnitude of hysteresis is preferred to absorb any such rattling or sobbing. On the other hand, a small magnitude of hysteresis is preferred to absorb fine vibration which occurs when the engine is idling, or fine vibration which occurs when the vehicle is slowly accelerated.

SUMMARY OF THE INVENTION

It is an object of this invention to provide a novel and improved torque variation absorbing device which can overcome the drawbacks of the prior art as hereinabove pointed out.

This object is attained by a device comprising a hysteretic mechanism, a damper mechanism and a torque limiting mechanism which are disposed between two separate, concentric and rotatable inertial bodies, characterized in that a plurality of elastic bodies defining the damper mechanism are disposed in series between the inertial bodies, the device further including a plurality of friction members and a plurality of floating disks provided between the inertial bodies so that the floating disks may create a certain magnitude of small hysteresis through the friction members and act upon at least one of the elastic bodies upon contraction of the latter to absorb any fine variation in torque.

The number of each of the floating disks and the corresponding friction members is preferably equal to the number of the elastic bodies defining the damper mechanism less one.

BRIEF DESCRIPTION OF THE DRAWINGS

FIG. 4 is an enlarged sectional view of a torque limiting mechanism in a device according to another embodiment of this invention.

DETAILED DESCRIPTION OF THE INVENTION

Figure 1:
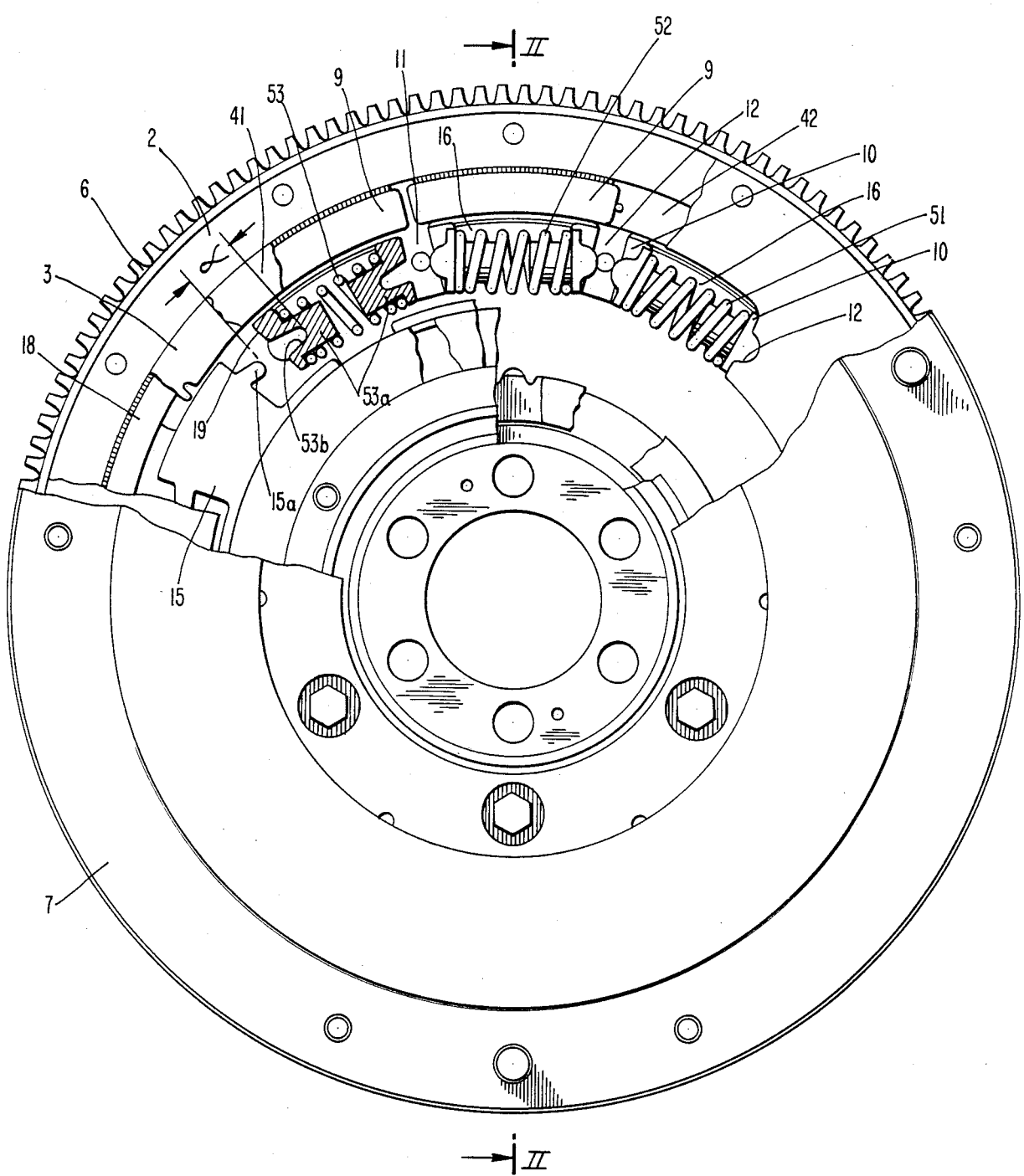
FIG. 1 is a front elevational view, partly in section, of a torque variation absorbing device embodying this invention.
Figure 2:
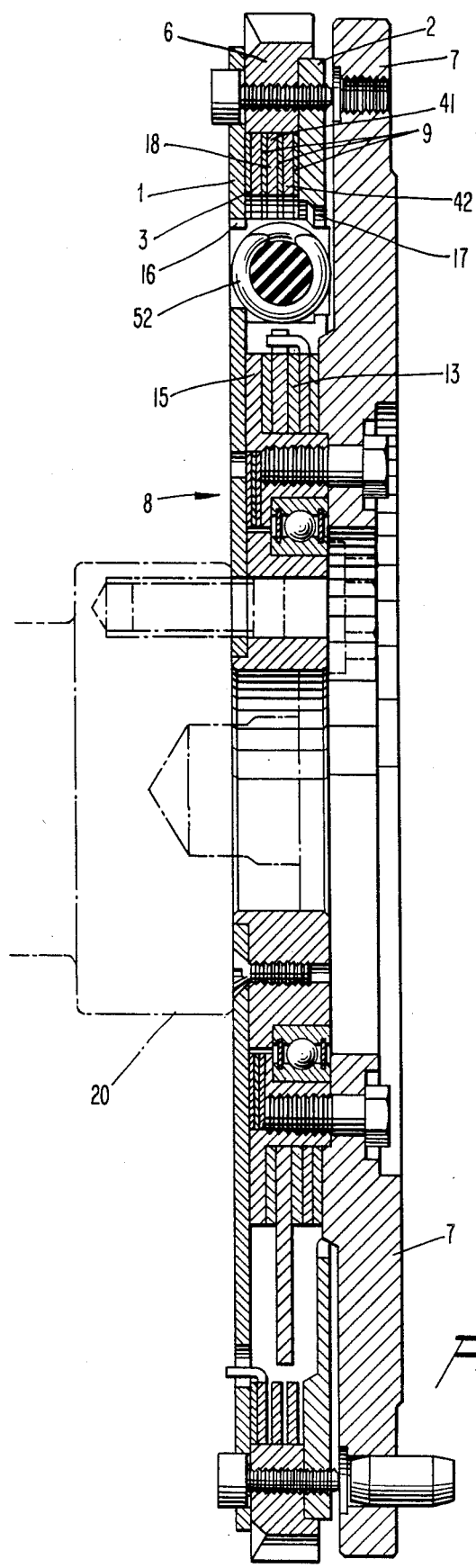
FIG. 2 is a sectional view taken along the line II—II of FIG. 1.

A device embodying this invention is shown in FIGS. 1 and 2. A set consisting of coil springs 51 to 53 and spring seats 10 is disposed between a drive plate 1 having a window 16 and a drive plate 2 having a corresponding window 17. They are disposed in series to one another between the windows 16 and 17. The coil springs 51 to 53 are held between the end 12 of the window in the drive plate 2 and the end 19 of the window in the drive plate 1. A floating disk 42 has an arm 12 held between the adjoining springs 51 and 52 and another floating disk 41 has an arm 11 held between the adjoining springs 52 and 53. The floating disks 41 and 42 are each a ring located radially outwardly of the coil springs 51 to 53. The floating disks 41 and 42 are coaxial with each other and a friction member 9 is disposed therebetween. Another friction member 9 is disposed between a floating plate 3 and the floating disk 41. Still another friction member 9 is disposed between the floating disk 42 and the drive plate 2.

The friction members 9 have a very low coefficient of friction corresponding to that of the floating disks acting upon the coil springs 51 to 53. A dish-shaped spring 18 is disposed between the drive plate 1 and the floating plate 3. The floating plate 3 is movable axially, but not circumferentially or radially, of the device. The drive plate 2 and the floating plate 3 are movable with an inertial body 6 on the driving side.

The floating disks 41 and 42 are annular and surround the elastic bodies 51 to 53. The arms 11 and 12 of the floating disks 41 and 42 form a circular array and are equal in number to driven disk arms 15. The driven disk arm 15 has a circumferentially directed projection 15a which is spaced apart from an adjacent circumferentially directed recess 53b in a retainer 53a for the spring 53 by an angle $\alpha$ of play torsion, but which is engageable therewith upon rotation relative to each other. This angle is also shown at $\alpha$ in FIG. 3.

The output of an internal combustion engine not shown is transmitted to the inertial body 6 through a driving shaft 20.

Figure 3:
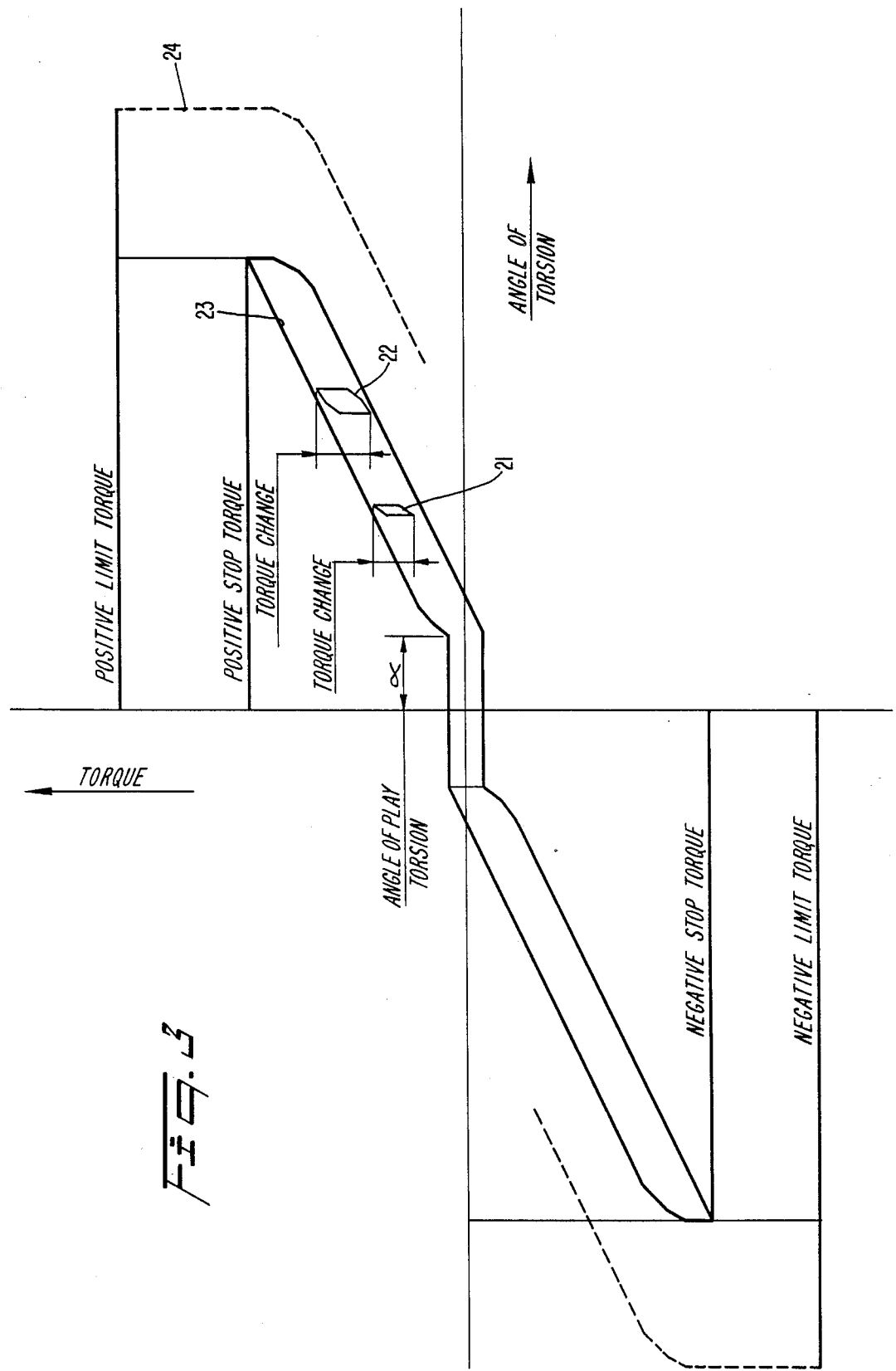
FIG. 3 is a chart showing the torsional characteristics of the device.

(i) If the torque received by the inertial body 6 is lower than the hysteresis torque by a hysteretic mechanism 8, only the driven disk arm 15 moves to a very small extent within the angle $\alpha$ as shown in FIG. 3.

(ii) If the torque received by the inertial body 6 is neither lower than the hysteresis torque by the hysteretic mechanism 8 nor higher than the hysteresis torque moving the floating disk 41 alone, the arm 11 of the floating disk 41 stays at rest relative to the movement of the drive plate 2. The hysteresis torque for the whole assembly is produced only by the hysteretic mechanism 8 and only the coil spring 53 functions, as shown at 21 in FIG. 3.

(iii) If the torque received by the inertial body 6 is equal to, or higher than, the range described at (ii) above and is equal to, or lower than, the hysteresis torque moving both of the floating disks 41 and 42, the arm 11 of the floating disk 41 moves and acts upon the coil spring 52. The arm 12 of the floating disk 42 stays at rest relative to the arm 11. The hysteresis torque for the whole assembly is equal to the torque produced by the hysteretic mechanism 8 plus the torque which is required for moving the floating disk 41. The coil springs 53 and 52 act in series to each other, as shown at 22 in FIG. 3.

(iv) If the torque received by the inertial body 6 is equal to, or higher than, the range described at (iii) above, the arm 12 of the floating disk 42 moves and acts upon the coil spring 51.

The torque is, then, transmitted from the driven disk arm 15 to a plate 14 through the springs 53, 52 and 51. Then, it is transmitted to an inertial body 7 on the driven side through a friction element 13 on a torque limiter. The hysteresis torque for the whole assembly is now equal to the torque produced by the hysteretic mechanism 8 plus the torque which is required for moving both of the floating disks 41 and 42. The three coil springs 53, 52 and 51 act in series to one another, as shown at 23 in FIG. 3.

If resonance occurs, the torque limiter 13 functions to provide a wide angle of torsion, as shown at 24 in FIG. 3.

A specific magnitude of hysteresis depending on the degree of torque variation is generated to enable the effective absorption of any torsional vibration, whether it may be large or small. Moreover, the torque transmitting capacity of the limiting mechanism and that of the floating mechanism can be set at different levels in accordance with the magnitude of hysteresis which is required.

Reference is now made to FIG. 4 showing another embodiment of this invention. A spring 32 is disposed between two annular floating disks 31. The floating disks are rotatably supported by a spacer 35 which is rotatably supported on a driven plate 36. They are disposed between two driven disks 43 and 44 which are rotatably supported on the driven plate 36. A friction member 33 is disposed between one of the floating disks 31 and the driven disk 43. Another friction member 33 is disposed between the other floating disk 31 and the driven disk 44. The spacer 35 is secured to the driven disks 43 and 44. A friction member 61 is disposed between the driven disk 43 and the driven plate 36. Another friction member 61 is disposed between the driven disk 44 and a flywheel plate 37. The flywheel plate 37 is connected to a flywheel 39 so that it may be movable axially, but not circumferentially or radially. A dish-shaped spring 38 is disposed between the flywheel plate 37 and the flywheel 39.

Torque is inputted to the driven disk 43 through the floating disks 31 and three coil springs 40 which are disposed in series to one another. It is transmitted from the driven disk 43 to the driven disk 44 through the spacer 35 and from the driven disk 44 to the flywheel 39 through the friction member 61 and the flywheel plate 37. The transmission of the torque takes place independently of the floating mechanism and the device is functionally identical to the device of FIGS. 1 and 2.

According to this invention, the friction members having an approriate coefficient of friction and the corresponding floating disks are disposed between the adjoining damper mechanisms (coil springs), and the coil springs are disposed in series to one another between the inertial bodies. This arrangement makes it possible to realize a wide angle of torsion and a large magnitude of hysteresis, as well as a very small magnitude of hysteresis, and thereby eliminates the necessity for any large angle of play torsion. The hysteresis having a large magnitude prevents the rattling of the differential and the sobbing of the vehicle, while the hysteresis having a very small magnitude prevents any fine vibration making an objectionable sound.

What is claimed is:

1. In a torque variation absorbing device comprising a hysteretic mechanism, a damper mechanism and a torque limiting mechanism which are disposed between two separate, concentric and rotatable inertial bodies, the improvement comprising a plurality of elastic bodies defining said damper mechanism and disposed in series between said inertial bodies, a plurality of concentric, annular friction members positioned radially outward of said elastic bodies and between said inertial bodies, a plurality of floating disks positioned radially outward of said elastic bodies and between said inertial bodies, the position of said friction members and said floating disks between said inertial bodies permits said floating disks to create a very small magnitude of hysteresis through said friction members, said floating disks acting upon at least one of said elastic bodies upon contraction of said at least one of said elastic bodies to absorb any fine variation in torque.

2. A device as set forth in claim 1, wherein the number of each of said floating disks and said friction members is equal to that of said elastic bodies less one.

3. A device as set forth in claim 1, wherein said damper mechanism comprises a plurality of damper units from a first damper unit to an n-th damper unit, said first damper unit being adapted to absorb any variation in torque if said variation is smaller than a first predetermined level, said first damper unit and a second damper unit being adapted to absorb said variation if said variation is between said first predetermined level and a second predetermined level which is greater than said first predetermined level, an $(n-1)$th damper unit and said n-th damper unit adapted to absorb said variation if said variation is between an $(n-1)$th predetermined level and an n-th predetermined level which is greater than said $(n-1)$th predetermined level.

4. In a torque variation absorbing device comprising a hysteretic mechanism, a damper mechanism and a torque limiting mechanism which are disposed between two separate, concentric and rotatable inertial bodies, the improvement comprising a plurality of elastic bodies defining said damper mechanism and disposed in series between said inertial bodies, a plurality of concentric, annular friction members positioned radially inwardly of said elastic bodies and between said inertial bodies, a plurality of floating disks positioned radially inwardly of said elastic bodies and between said inertial bodies, the position of said friction members and said floating disks between said inertial bodies permits said floating disks to create a very small magnitude of hysteresis through said friction members, said floating disks acting upon at least one of said elastic bodies upon contraction of said at least one of said elastic bodies to absorb any fine variation in torque.

* * * * *